US008717991B2

(12) United States Patent
Park et al.

(10) Patent No.: US 8,717,991 B2
(45) Date of Patent: May 6, 2014

(54) APPARATUS AND METHOD FOR OPERATING MULTI-CHANNEL BASED ON WIRELESS ACCESS IN VEHICULAR ENVIRONMENTS

(75) Inventors: Jong Min Park, Daejeon (KR); Sangwoo Lee, Daejeon (KR); Min Jung Kim, Daejeon (KR); Hyun Kyun Choi, Daejeon (KR); Hyun Seo Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 234 days.

(21) Appl. No.: 13/209,830

(22) Filed: Aug. 15, 2011

(65) Prior Publication Data
US 2012/0099541 A1 Apr. 26, 2012

(30) Foreign Application Priority Data

Oct. 22, 2010 (KR) .................. 10-2010-0103699
Dec. 7, 2010 (KR) .................. 10-2010-0124389

(51) Int. Cl.
*H04W 4/04* (2009.01)
(52) U.S. Cl.
USPC .......................................... 370/329; 370/502
(58) Field of Classification Search
USPC ......... 370/328–329, 336, 338, 341–343, 345, 370/348, 350, 437, 441–444, 503–504, 370/509–510, 512–514
See application file for complete search history.

(56) References Cited

U.S. PATENT DOCUMENTS

| 6,909,879 | B1 * | 6/2005 | Centore, III ................. 455/63.1 |
| 7,804,805 | B2 | 9/2010 | Park et al. |
| 7,813,371 | B2 | 10/2010 | McNew et al. |
| 8,462,704 | B2 * | 6/2013 | Hu ................................ 370/328 |
| 2008/0069040 | A1 | 3/2008 | An |
| 2009/0103460 | A1 | 4/2009 | Oh et al. |
| 2009/0180414 | A1 * | 7/2009 | Maeda et al. ................. 370/311 |
| 2010/0272004 | A1 * | 10/2010 | Maeda et al. ................. 370/312 |
| 2011/0026472 | A1 * | 2/2011 | Reumerman et al. ......... 370/329 |
| 2011/0141970 | A1 * | 6/2011 | Juan et al. ..................... 370/328 |
| 2012/0028675 | A1 * | 2/2012 | Lee et al. ...................... 455/525 |
| 2012/0093091 | A1 * | 4/2012 | Kang et al. ................... 370/329 |
| 2012/0127874 | A1 * | 5/2012 | Oh et al. ....................... 370/252 |

FOREIGN PATENT DOCUMENTS

| KR | 10-2007-0000371 | 1/2007 |
| KR | 10-2008-0026461 | 3/2008 |
| KR | 10-2009-0039097 | 4/2009 |

OTHER PUBLICATIONS

Sung-Dae Jung, et al., "Development of Clustering-Based Multi-Channel MAC Protocol to Improve Efficiency of Network in VANET", 2009, pp. 463-468.

* cited by examiner

*Primary Examiner* — Kevin Mew
(74) *Attorney, Agent, or Firm* — Staas & Halsey LLP

(57) ABSTRACT

In a vehicle communication system, a multi channel operation apparatus for communication of a vehicle or a road side base station operates a multi channel in one physical layer and differentially transmits a frame through a corresponding channel according to a user priority order value of a frame to transmit.

10 Claims, 13 Drawing Sheets

APPARATUS AND METHOD FOR OPERATING MULTI-CHANNEL BASED ON WIRELESS ACCESS IN VEHICULAR ENVIRONMENTS

CROSS-REFERENCE TO RELATED APPLICATION

This application claims priority to and the benefit of Korean Patent Application No. 10-2010-0103699 and 10-2010-0124389 filed in the Korean Intellectual Property Office on Oct. 22, 2010 and Dec. 7, 2010, the entire contents of which are incorporated herein by reference.

BACKGROUND OF THE INVENTION (a) Field of the Invention

The present invention relates to an apparatus and method for operating a (wireless access in vehicular environments) WAVE-based multi channel.

(b) Description of the Related Art

In a wireless network, when several communication nodes shares one radio channel, if two or more communication nodes simultaneously uses a radio channel, collision occurs and thus communication cannot be performed. In order to lower probability of such collision, a communication node uses a carrier sense multiple access with collision avoidance (CSMA/CA) method using a random backoff time.

In the CSMA/CA method, when a communication node has data to transmit, the communication node grasps an occupying state of one radio channel, and when a radio channel is in an idle state, the communication node transmits data. If a radio channel is not in an idle state, the communication node sets a random backoff time and checks the radio channel while reducing a random backoff counter value according to the random backoff time. In this case, when a backoff counter value according to a random backoff time is 0, if a radio channel is an idle state, the communication node transmits data.

In this way, in one physical layer, when a channel occupying ratio of communication nodes is not high, a CSMA/CA method based on one radio channel, i.e., a single channel has low collision probability and thus the single channel-based CSMA/CA method is efficient. However, as the quantity of communication nodes increases and a data amount to transmit increases, a use frequency of a network increases and the network becomes complicated, and thus probability to cause communication delay and communication failure increases due to packet collision.

Communication environment between vehicles has characteristics that the quantity of communication nodes frequently changes according to the quantity of vehicles even in the same range. Particularly, in an area having a high density of vehicles, such as a downtown area or a roadside intersection, a situation in which a plurality of communication nodes simultaneously perform communication frequently occurs. Therefore, a single channel-based CSMA/CA method may cause frequent communication delay and communication failure in communication environment between vehicles.

Further, in the CSMA/CA method, a priority order is not provided to data to send. Therefore, transmission delay of emergency data to urgently transmit in real-time may occur.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method for operating a WAVE-based multi channel having advantages of reducing transmission delay and transmission failure probability.

An exemplary embodiment of the present invention provides a method of operating a multi channel in a communication apparatus of a vehicle or a road side base station of a vehicle communication system. The method includes receiving a transmission request of a frame from an upper level layer; determining whether the frame can be transmitted at a current channel interval; storing, if the frame can be transmitted at a current channel interval, the frame in one hardware queue of a plurality of hardware queues according to a user priority order value of the frame; and transmitting the frame that is stored in the plurality of hardware queues according to a random backoff time of the plurality of hardware queues.

Another embodiment of the present invention provides a multi channel operation apparatus for communication of a vehicle or a road side base station in a vehicle communication system. The multi channel operation apparatus includes a channel synchronization unit and a data transmitting/receiving unit. The channel synchronization unit performs communication by setting synchronization of a sync interval in synchronism with a reference signal and repeatedly setting the sync interval. The data transmitting/receiving unit determines whether a frame can be transmitted by checking a current channel interval and differentially transmits the frame according to a user priority order value of the frame. In this case, the sync interval includes a first guard interval, a control channel (CCH) interval, a second guard interval, and a service channel (SCH) interval.

Yet another embodiment of the present invention provides a method of operating a multi channel for communication in a communication apparatus of a vehicle or a road side base station in a vehicle communication system. The method includes alternately setting a control channel interval and a service channel interval in synchronism with a reference signal; receiving a transmission request of a frame from an upper level layer; checking a user priority order value of the frame; and differentially transmitting, if the frame can be transmitted at the current channel interval from a user priority order value of the frame, the frame according to a user priority order value of the frame.

DETAILED DESCRIPTION OF THE EMBODIMENTS

Figure 1:
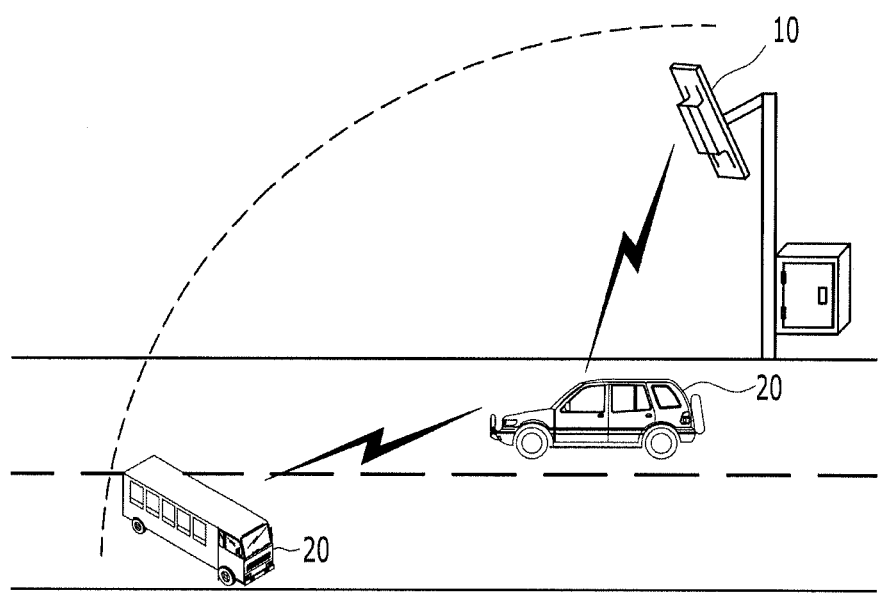
FIG. 1 is a diagram illustrating a communication network to which the present invention is applied.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising", will be understood to imply the inclusion of stated elements but not the exclusion of any other elements.

Hereinafter, an apparatus and method for operating a multi channel in a vehicle communication system according to an exemplary embodiment of the present invention will be described in detail with reference to the drawings.

FIG. 1 is a diagram illustrating a communication network to which the present invention is applied. Referring to FIG. 1, a communication network to which the present invention is applied includes a road side equipment (hereinafter, referred to as a "RSE") 10 of a road side base station and an on-board unit (hereinafter, referred to as a "OBU") 20 that is mounted at a vehicle and is formed with a vehicle to infrastructure (V2I) between the OBU 20 and the RSE 10 and a vehicle to vehicle (V2V) between the OBUs 20.

The V2V provides a vehicle collision warning service and group communication based on communication between vehicles, and the V2I provides traffic information, a safety support, and a download service to vehicles.

The RSE 10 and the OBU 20 perform a multi channel operation using one physical (PHY) layer and perform V2V and V2I communication.

Figure 2:
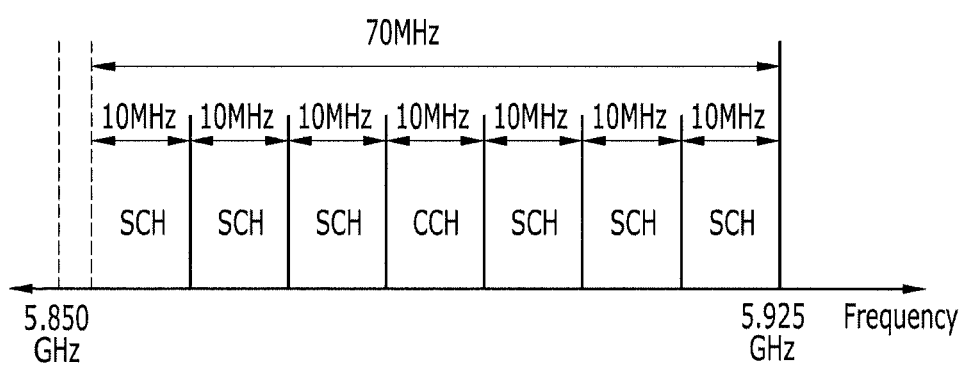
FIG. 2 is a diagram illustrating a multi channel from a frequency viewpoint according to an exemplary embodiment of the present invention.

FIG. 2 is a diagram illustrating a multi channel from a frequency viewpoint according to an exemplary embodiment of the present invention.

As shown in FIG. 2, the RSE 10 and the OBU 20 communicate through 7 channels in a frequency band (bandwidth 75 MHz) 5.85-5.925 GHz. One of 7 channels is a traffic safety exclusive control channel (CCH), and the remainder six channels are a service channel (SCH) that is used for traffic safety or a general commercial service. An IP frame and a WAVE short message (WSM) frame can be transmitted to the SCH, and a management frame and a WSM frame can be transmitted to the CCH. Further, an emergency data frame to preferentially transmit can be transmitted through the CCH.

Because communication is performed using one channel at one time in one PHY layer, in one PHY layer, the RSE 10 and the OBU 20 divide the CCH and the SCH by a time domain and alternately perform communication.

Figure 3:
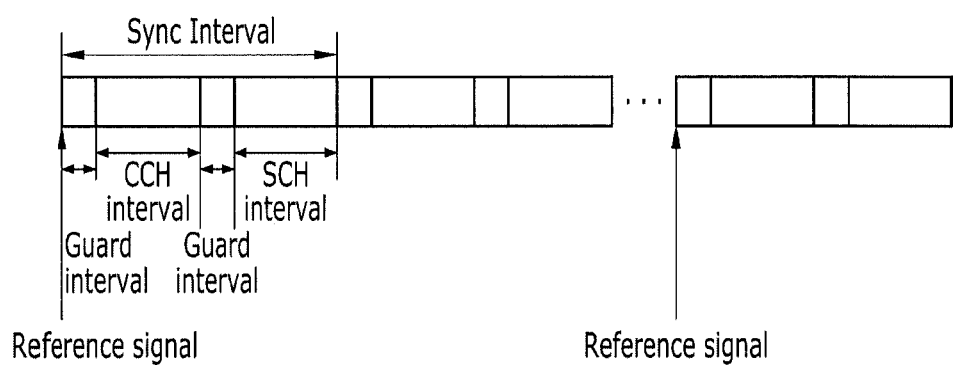
FIG. 3 is a diagram illustrating a method of operating a multi channel in one PHY layer.

FIG. 3 is a diagram illustrating a method of operating a multi channel in one PHY layer.

Referring to FIG. 3, in order to operate a multi channel in one PHY layer, the RSE 10 and the OBU 20 determine a sync interval based on a reference signal.

The sync interval includes a CCH interval and a SCH interval. In this case, a guard interval is included between the CCH interval and the SCH interval in consideration of an operating time and synchronization necessary for changing a frequency. In this case, a reference signal may be a signal that is generated using a coordinated universal time (UTC) time signal, i.e., a GPS signal.

The RSE 10 and the OBU 20 repeatedly set a sync interval (i.e., a guard interval, a CCH interval, a guard interval, and a SCH interval) until a next reference signal generates, and when a next reference signal generates, the RSE 10 and the OBU 20 stop a previously repeated channel interval and repeatedly set again a sync interval.

At the guard interval, a frame is not transmitted, and at the CCH interval and the SCH interval, a frame is transmitted through a corresponding channel. At the CCH interval, a control frame of a WAVE short message protocol (WSMP) can be transmitted/received between the RSE 10 and the OBU 20, and at the SCH interval, an IP frame and a control frame can be transmitted/received between the RSE 10 and the OBU 20.

Thereby, the RSE 10 and the OBU 20 can perform communication using a multi channel in one PHY layer.

Figure 4:
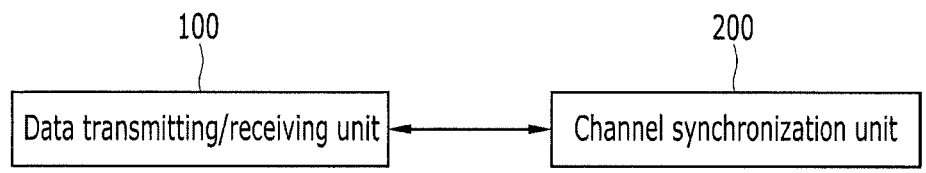
FIG. 4 is a block diagram illustrating a multi channel operation apparatus according to an exemplary embodiment of the present invention.

FIG. 4 is a block diagram illustrating a multi channel operation apparatus according to an exemplary embodiment of the present invention.

Referring to FIG. 4, the RSE 10 and the OBU 20 include a multi channel operation apparatus for performing communication using a multi channel in one PHY layer.

The multi channel operation apparatus includes a data transmitting/receiving unit 100 and a channel synchronization unit 200.

When the data transmitting/receiving unit 100 receives a request for transmission of a frame from an upper level layer, the data transmitting/receiving unit 100 transmits a transmission request frame using a multi channel in one PHY layer. In this case, the data transmitting/receiving unit 100 can differentially transmit a transmission request frame according to a user priority order value of a transmission request frame.

Specifically, the data transmitting/receiving unit 100 determines whether a transmission request frame can be transmitted at a corresponding channel interval according to a user priority order value of a transmission request frame.

Each frame that arrives at a MAC layer from an upper level layer has a specific user priority order value, and such a user priority order value is included in a MAC header of a frame. In this case, a frame type, i.e., an IP frame or a management frame can be seen from the user priority order value. Therefore, a channel routing unit 130 determines whether a frame can be transmitted through a SCH of a SCH interval or through a CCH of a CCH interval from a user priority order value of a frame.

The data transmitting/receiving unit 100 determines whether a current channel interval is an interval that can transmit a transmission request frame, and if a current channel interval is an interval that can transmit a transmission request frame and if a medium access control (MAC) hardware queue of a channel corresponding to the current channel interval is empty, the data transmitting/receiving unit 100 transmits the transmission request frame. If a current channel interval is an interval that can transmit a transmission request frame, but if a MAC hardware queue of a channel corresponding to the current channel interval is not empty, until next transmission interrupt generates, the data transmitting/receiving unit 100 awaits transmission of the transmission request frame.

For example, an IP frame can be transmitted through a SCH of a SCH interval. Therefore, when a transmission request frame is an IP frame, if a current channel interval is a CCH interval, until a current channel interval becomes a SCH interval, the data transmitting/receiving unit 110 awaits transmission of a transmission request frame. If a current channel interval is a SCH interval, the data transmitting/receiving unit 110 checks space of a MAC hardware queue of a SCH, and if the SCH is in a transmission possible state, the data transmitting/receiving unit 110 transmits the transmission request frame, and if the SCH is not in a transmission possible state, until the SCH is in a transmission possible state, the data transmitting/receiving unit 110 awaits transmission of the transmission request frame.

The channel synchronization unit 200 corresponds synchronization of a sync interval with another communication apparatus using a reference signal and repeatedly sets a sync interval. Further, whenever a channel interval is changed, the channel synchronization unit 200 transfers information of the channel interval to the data transmitting/receiving unit 100. That is, by transmitting information of a current channel interval to the data transmitting/receiving unit 100, the channel synchronization unit 200 can transmit a transmission request frame to correspond to a current channel interval.

Figure 5:
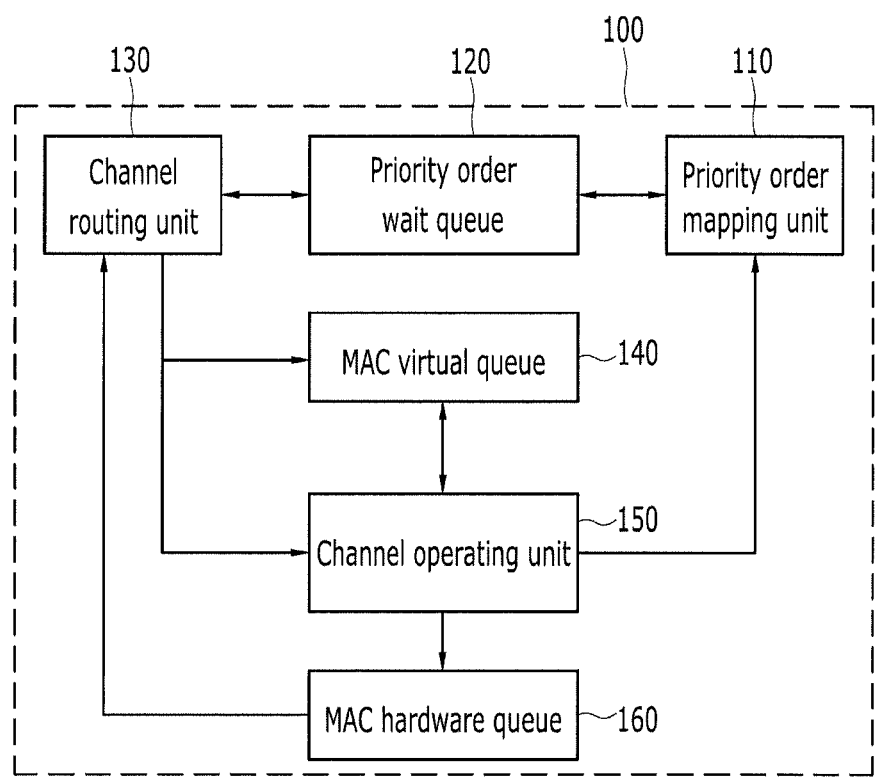
FIG. 5 is a block diagram illustrating a configuration of a data transmitting/receiving unit that is shown in FIG. 4.

FIG. 5 is a block diagram illustrating a configuration of a data transmitting/receiving unit that is shown in FIG. 4, and FIGS. 6 to 8 are diagrams illustrating a priority order wait queue, a MAC virtual queue, and a MAC hardware queue, respectively that are shown in FIG. 5.

Referring to FIG. 5, the data transmitting/receiving unit 100 includes a priority order mapping unit 110, a priority order wait queue 120, a channel routing unit 130, a MAC virtual queue 140, a channel operating unit 150, and a MAC hardware queue 160.

The priority order mapping unit 110, the priority order wait queue 120, the channel routing unit 130, and the channel operating unit 150 may be included in a MAC software terminal, and the MAC hardware queue 160 may be included in a MAC hardware terminal.

The priority order mapping unit 110 maps a transmission request frame to an access category (AC) level according to a user priority order value of a transmission request frame and stores the transmission request frame in the priority order wait queue 120. A user priority order value of the transmission request frame is allocated to a corresponding one AC level.

As an example, in an enhanced distributed channel access (EDCA), which is a competition-based channel access method, four AC levels are defined.

Figure 6:
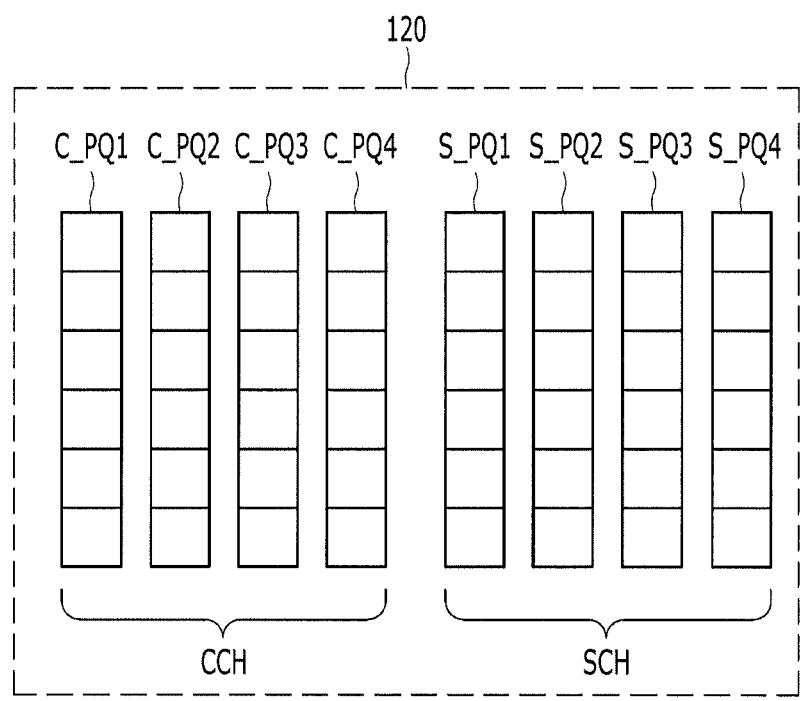
FIGS. 6 to 8 are diagrams illustrating a priority order wait queue, a MAC virtual queue, and a MAC hardware queue, respectively that are shown in FIG. 5.

Referring to FIG. 6, the priority order wait queue 120 includes a plurality of wait queues C_PQ1-C_PQ4 that store a frame in order to await the frame to transmit to a CCH and a plurality of wait queues S_PQ1-S_PQ4 that store a frame in order to await the frame to transmit to a SCH.

The plurality of wait queues C_PQ1-C_PQ4/S_PQ1-S_PQ4 corresponds to AC levels, respectively. FIG. 6 illustrates four AC levels.

That is, a frame that is transmitted to a CCH is stored in one of a plurality of wait queues C_PQ1-C_PQ4 according to an AC level, and a frame that is transmitted to a SCH is stored in one of a plurality of wait queues S_PQ1-S_PQ4 according to an AC level.

Referring again to FIG. 5, when the channel routing unit 130 receives a transmission request frame from an upper level layer, the channel routing unit 130 calls the channel operating unit 150 and starts operation for transmitting the transmission request frame.

Further, the channel routing unit 130 receives transmission interrupt from the MAC hardware queue 160 and performs operation for transmitting a transmission request frame that is stored in the priority order wait queue 120. Specifically, the channel routing unit 130 selects a transmission request frame from the priority order wait queue 120 to correspond to transmission interrupt. For example, when the channel routing unit 130 receives transmission interrupt of a CCH from a corresponding hardware queue of the MAC hardware queue 160, the channel routing unit 130 selects a transmission request frame from a wait queue corresponding to a queue in which transmission interrupt of the CCH generates among a plurality of wait queues C_PQ1-C_PQ4. That is, when a hardware queue C_HQ1 and a wait queue C_PQ1 correspond to the same AC level, if the channel routing unit 130 receives transmission interrupt from the hardware queue C_HQ1, the channel routing unit 130 can select a transmission request frame from the wait queue C_PQ1.

Thereafter, the channel routing unit 130 stores a destination address at a corresponding position of the MAC virtual queue 140 according to a user priority order value of the selected transmission request frame and calls the channel operating unit 150.

Figure 7:
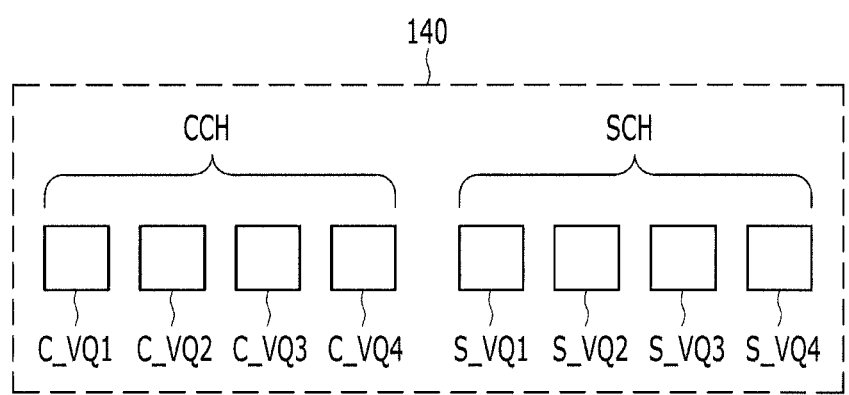

Referring to FIG. 7, the MAC virtual queue 140 includes a plurality of virtual queues C_VQ1-C_VQ4 that store a destination address of a frame to transmit to a CCH and a plurality of virtual queues S_VQ1-S_VQ4 that store a destination address of a frame to transmit to a SCH.

The plurality of virtual queues C_VQ1-C_VQ4/S_VQ1-S_VQ4 corresponds to AC levels, respectively. Therefore, a destination address of a transmission request frame can be stored in a corresponding one virtual queue according to a user priority order value of a transmission request frame and an AC level.

Figure 8:
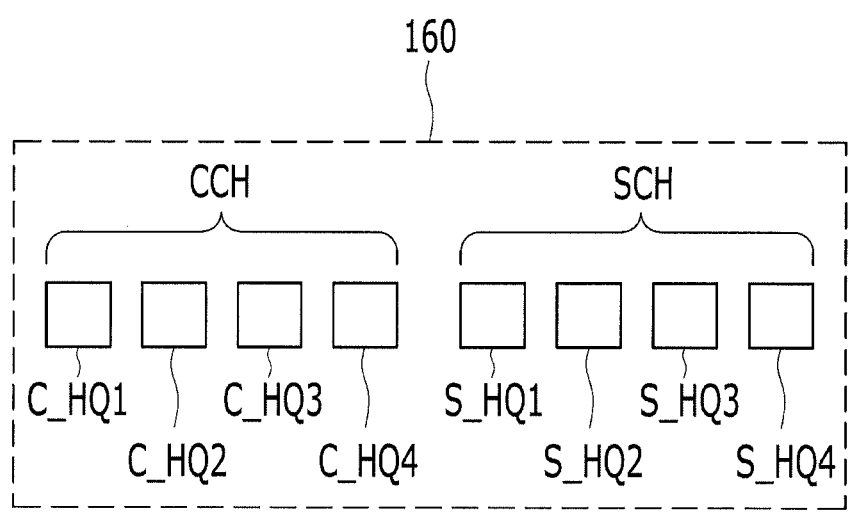

Referring to FIG. 8, the MAC hardware queue 160 includes a plurality of hardware queues C_HQ1-C_HQ4 that store a frame to transmit to a CCH and a plurality of hardware queues S_HQ1-S_HQ4 that store a frame to transmit to a SCH.

The plurality of hardware queues C_HQ1-C_HQ4/S_HQ1-S_HQ4 corresponds to AC levels, respectively. Therefore, a transmission request frame can be stored in a corresponding one hardware queue according to a type of the transmission request frame and an AC level.

Different random backoff times according to AC levels are set to the plurality of hardware queues C_HQ1-C_HQ4/S_HQ1-S_HQ4. By shortly setting a random backoff time to a hardware queue of an AC level corresponding to a high priority order, the hardware queue has a priority of a channel use right.

That is, if a random backoff time becomes 0, the plurality of hardware queues C_HQ1-C_HQ4/S_HQ1-S_HQ4 send a frame to a modem terminal (not shown). Therefore, if a random backoff time is shortly set, a frame can be quickly transmitted to a modem terminal.

A frame is encoded and transmitted in the modem terminal. After the modem terminal transmits the frame, the modem terminal transmits a transmission completion signal to a MAC hardware terminal, and the MAC hardware terminal, having received the transmission completion signal generates transmission interrupt and transfers the transmission interrupt to the channel routing unit 130. That is, transmission interrupt represents a state in which the plurality of hardware queues C_HQ1-C_HQ4/S_HQ1-S_HQ4 are empty.

When transmission of the stored transmission request frame is complete, the plurality of hardware queues C_HQ1-C_HQ4/S_HQ1-S_HQ4 generate transmission interrupt and transfers the transmission interrupt to the channel routing unit 130.

Further, when transmission of the stored transmission request frame is complete, the plurality of hardware queues C_HQ1-C_HQ4/S_HQ1-S_HQ4 delete a stored destination address even in a plurality of virtual queues C_VQ1~C_VQ4/S_VQ1~S_VQ4 corresponding thereto. For example, if the hardware queue C_HQ1 and the virtual queue C_VQ1 correspond to the same AC level, when transmission of a transmission request frame that is stored in the hardware queue C_HQ1 is complete, the virtual queue C_VQ1 deletes the stored destination address. Thereby, double transmission of the same frame can be prevented.

Referring again to FIG. 5, whenever a channel interval is changed by the channel synchronization unit 200, the channel operating unit 150 receives information of a channel interval.

Further, the channel operating unit 150 determines whether a destination address of a transmission request frame corresponds with a destination address that is stored in a corresponding virtual queue, and if a destination address of a transmission request frame corresponds with a destination address that is stored in a corresponding virtual queue, the channel operating unit 150 performs operation for transmitting the transmission request frame.

The channel operating unit 150 checks space of a hardware queue of a corresponding AC level according to a user priority order value of a transmission request frame at a current channel interval. Thereafter, if space of a corresponding hardware queue can store a transmission request frame, the channel operating unit 150 stores the transmission request frame in the corresponding hardware queue, and if space of a corresponding hardware queue cannot store a transmission request frame, the channel operating unit 150 transfers the transmission request frame to the priority order mapping unit 110 and awaits transmission of the transmission request frame.

Figure 9:
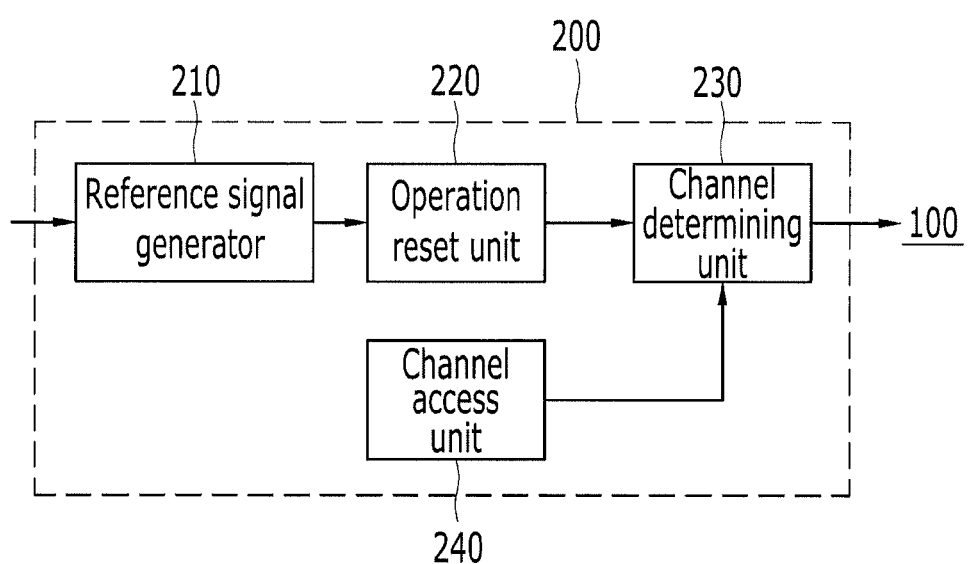
FIG. 9 is a block diagram illustrating a channel synchronization unit that is shown in FIG. 4.

FIG. 9 is a block diagram illustrating a channel synchronization unit that is shown in FIG. 4.

Referring to FIG. 9, the channel synchronization unit 200 includes a reference signal generator 210, an operation reset unit 220, a channel determining unit 230, and a channel access unit 240.

The reference signal generator 210 generates a pulse per second (PPS) signal, which is a reference signal using a coordinated universal time (UTC) time signal, i.e., a GPS signal.

In the OBU 20 that cannot receive a GPS signal, the reference signal generator 210 receives a timing advertisement (TA) message from the RSE 10 and generates a reference signal. That is, because the reference signal generator 210 can estimate a generation point of a PPS signal using a timing synchronization function (TSF) value of a TA frame, the reference signal generator 210 operates a timer with 1 second interval from an estimated generation time point, thereby generating a reference signal.

The operation reset unit 220 resets a multi channel operation in synchronism with a reference signal, thereby corresponding synchronization of a sync interval. That is, the operation reset unit 220 stops a channel interval that has been previously repeated in synchronism with a reference signal and sets a channel interval of a new sync interval as a guard interval, thereby starting again a multi channel operation.

When a reference signal is an effective signal, the operation reset unit 220 activates a multi channel operation.

When a reference signal is a PPS signal, the operation reset unit 220 calculates a difference value between a count value of a system hardware timer to a reference signal and a software estimation count value to 1 second, and when an error range of the difference value exists within predetermined reliability, for example, 95%, the operation reset unit 220 determines that a reference signal is an effective signal. Here, a system hardware timer operates based on a system clock (board). For example, if a system clock is 10 Mhz, the system hardware timer operates with 100 ns per cycle and thus in order to measure a time period of 1 second, the system hardware timer counts cycles of ten million times and may regard this as one second.

A software timer is a timer that receives a system clock and that operates within a software processor (ARM), and by comparing a hardware timer count value and a software count estimation value, reliability of values of a system hardware timer based on a system clock and a software timer is checked.

Until a next reference signal generates, a guard interval, a CCH interval, a guard interval, and a SCH interval are repeated, and thus whenever a channel interval is changed, the channel determining unit 230 transfers information of a channel interval to the channel operating unit 150. That is, whenever a channel interval is changed, the channel determining unit 230 determines a current channel interval and transfers information of a current channel interval to the channel operating unit 150.

The channel access unit 240 checks space of a MAC hardware queue of a corresponding channel at a current channel interval and transfers space information to the channel operating unit 150. Accordingly, the channel operating unit 150 determines transmission of a transmission request frame using a space state of a MAC hardware queue. That is, the channel access unit 240 determines a multi channel and allows the channel operating unit 150 to transmit a transmission request frame.

Figure 10:
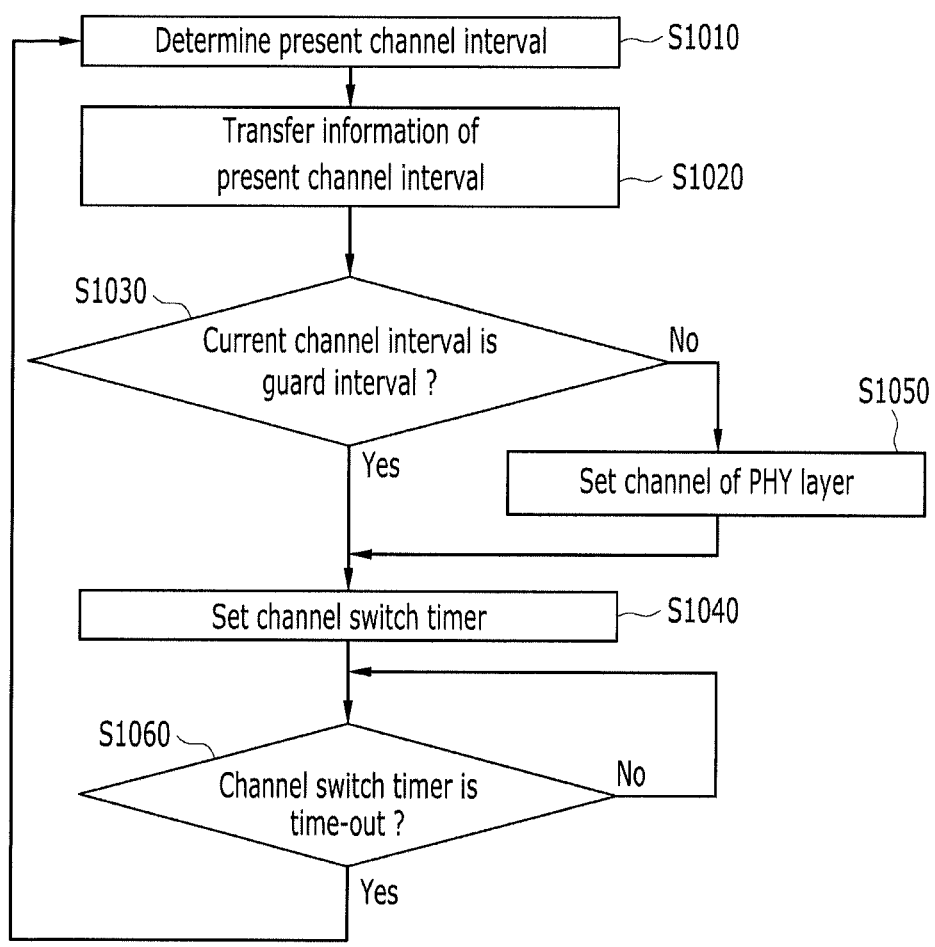
FIG. 10 is a flowchart illustrating a method of determining a channel in a channel synchronization unit.

FIG. 10 is a flowchart illustrating a method of determining a channel in a channel synchronization unit.

Referring to FIG. 10, the channel determining unit 230 determines a current channel interval (S1010) and transfers information of a current channel interval to the channel operating unit 150 and the channel access unit 240 (S1020).

The channel determining unit 230 determines whether a current channel interval is a guard interval, or a CCH interval or a SCH interval (S1030), and if a current channel interval is a guard interval, the channel determining unit 230 sets a channel switch timer with a value corresponding to a length of a CCH interval or a SCH interval according to a CCH interval or a SCH interval, which is a next channel (S1040).

If a current channel interval is a CCH interval or a SCH interval, the channel determining unit 230 sets a channel of a PHY layer to correspond to a current channel interval (S1050), and then sets a channel switch timer with a value corresponding to a length of a guard interval (S1040). To set a channel of a PHY layer is to set an operation frequency of a PHY layer to correspond to a CCH interval or a SCH interval, for example, to set an operation frequency of an actually operating channel among 7 channels that are shown in FIG. 2.

Thereafter, the channel determining unit 230 determines whether a channel switch timer is in a time-out state (S1060), and if a channel switch timer is in a time-out state, it means that a channel interval is changed and thus the channel determining unit 230 determines a current channel interval and the process is repeated (S1010-S1050).

When a channel interval is changed, a software timer operates to correspond to each channel interval, and thus operation corresponding to each channel interval can be performed for each channel interval, and when a software timer corresponding to each channel interval is in a time-out state, a corresponding channel interval is terminated.

Figure 11:
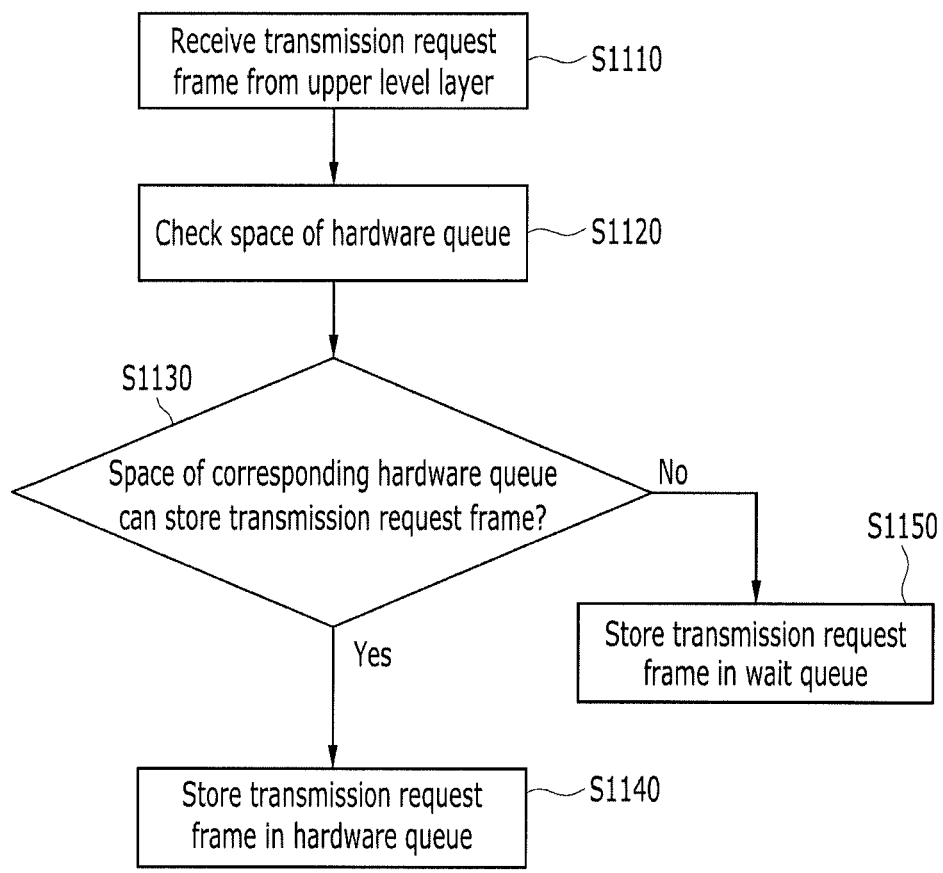
FIGS. 11 to 13 are flowcharts illustrating operation of a data transmitting/receiving unit according to first to third exemplary embodiments, respectively, of the present invention.
Figure 12:
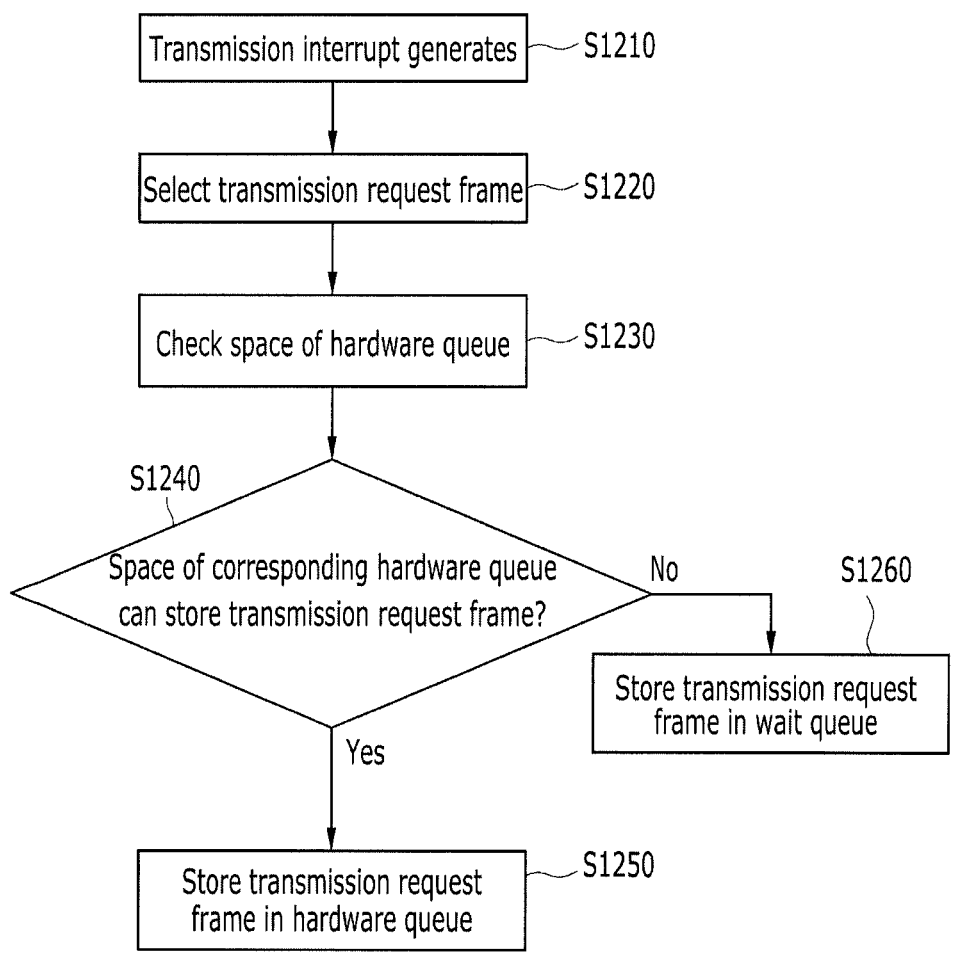

FIGS. 11 and 12 are flowcharts illustrating operation of a data transmitting/receiving unit according to first and second exemplary embodiments, respectively, of the present invention.

Referring to FIG. 11, when the channel routing unit 130 receives a transmission request frame from an upper level layer (S1110), the channel routing unit 130 stores a destination address of a transmission request frame in a virtual queue of a corresponding AC level according to a user priority order value of a transmission request frame and then calls the channel operating unit 150.

The channel operating unit 150 checks a user priority order value of a transmission request frame, checks space of a hardware queue of a corresponding channel interval of the transmission request frame (S1120), and determines whether space of a corresponding hardware queue can store a transmission request frame (S1130). If space of a corresponding hardware queue can store a transmission request frame, the channel operating unit 150 stores the transmission request frame in a hardware queue of a corresponding AC level and requests transmission of the transmission request frame (S1140).

If space of a corresponding hardware queue cannot store a transmission request frame, the channel operating unit 150 transfers the transmission request frame to the priority order mapping unit 110 and awaits transmission of the transmission request frame.

The priority order mapping unit 110 maps the transmission request frame to a corresponding AC level according to a user priority order value of the transmission request frame and stores the transmission request frame in a corresponding wait queue (S1150).

The transmission request frame that is stored in the wait queue awaits until transmission interrupt generates in the MAC hardware queue 160.

Referring to FIG. 12, when transmission interrupt generates in at least one hardware queue of the MAC hardware queue 160 (S1210), the channel routing unit 130 selects a transmission request frame from the priority order wait queue 120 corresponding to an AC level of a hardware queue in which transmission interrupt generates (S1220).

The channel routing unit 130 stores a destination address of a transmission request frame in a virtual queue of a corresponding AC level according to a user priority order value of a transmission request frame and then calls the channel operating unit 150.

The channel operating unit 150 checks a user priority order value of a transmission request frame, checks space of a hardware queue at a channel interval corresponding to an AC level of the transmission request frame (S1230), and determines whether space of a corresponding hardware queue can store a transmission request frame (S1240). If space of a corresponding hardware queue can store a transmission request frame, the channel operating unit 150 stores the transmission request frame in a hardware queue of a corresponding AC level and requests transmission of the transmission request frame (S1250).

If space of a corresponding hardware queue cannot store a transmission request frame, the channel operating unit 150 transfers the transmission request frame to the priority order mapping unit 110 and awaits transmission of the transmission request frame (S1260).

Figure 13:
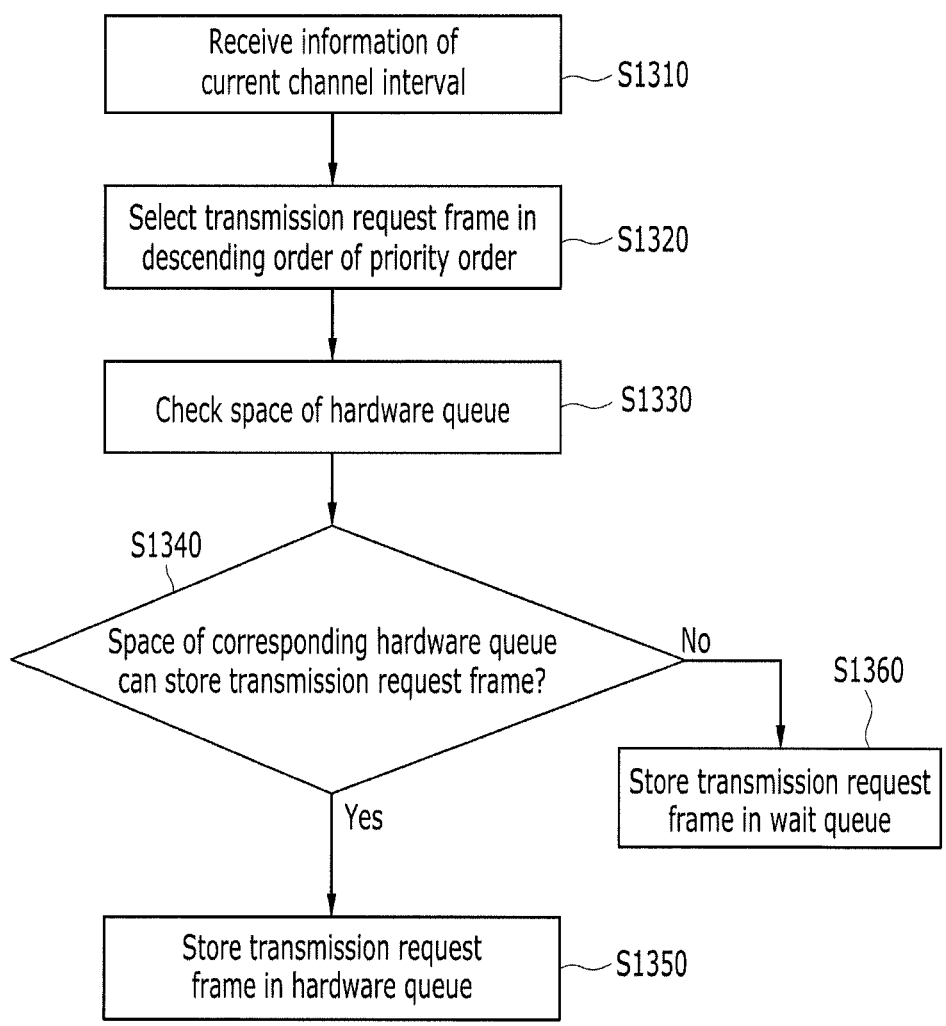

FIG. 13 is a flowchart illustrating operation of a data transmitting/receiving unit according to a third exemplary embodiment of the present invention.

Referring to FIG. 13, when information of a current channel interval receives from the channel determining unit 230 (S1310), the channel routing unit 130 sequentially selects a transmission request frame in descending order of a priority order in a wait queue in which a transmission request frame that can transmit through a channel of a current channel interval is stored (S1320). For example, when a current channel interval is in a CCH interval, the channel routing unit 130 selects a transmission request frame having a highest priority order among wait queues C_PQ1-C_PQ4.

Thereafter, with the above-described method, the channel operating unit 150 determines whether the selected transmission request data can be transmitted and stores a transmission request frame in a hardware queue of a corresponding AC level and requests transmission of the transmission request frame or awaits transmission of the transmission request frame until next transmission interrupt generates (S1330-S1360).

According to an exemplary embodiment of the present invention, by differentially transmitting a frame according to a user priority order value of the frame, transmission delay of emergency data to preferentially transmit can be reduced. Further, by using a multi channel-based CSMA/CA method using one physical (PHY) layer, communication delay and communication failure probability can be reduced, compared with a single channel-based CSMA/CA method.

An exemplary embodiment of the present invention may be not only embodied through the above-described apparatus and/or method but also embodied through a program that executes a function corresponding to a configuration of the exemplary embodiment of the present invention or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A multi channel operation apparatus for communication of a vehicle or a road side base station in a vehicle communication system, the multi channel operation apparatus comprising:
   a channel synchronization unit that performs communication by setting synchronization of a sync interval in synchronism with a reference signal and repeatedly setting the sync interval; and
   a data transmitting/receiving unit that determines whether a frame can be transmitted by checking a current channel interval and that differentially transmits the frame according to a user priority order value of the frame,
   wherein the sync interval comprises a first guard interval, a control channel interval, a second guard interval, and a service channel interval.

2. The multi channel operation apparatus of claim 1, wherein the data transmitting/receiving unit comprises
   a plurality of first hardware queues that store a frame of a control channel and that correspond to a plurality of access category (AC) levels, respectively that are allocated according to a user priority order value;

a plurality of second hardware queues that store a frame of a service channel and that correspond to AC levels, respectively that are allocated according to a user priority order value; and a channel operating unit that stores the frame in one of the plurality of first and second hardware queues according to a user priority order value of the frame.

3. The multi channel operation apparatus of claim 2, wherein the channel operating unit checks a user priority order value of the frame and determines that the frame can be transmitted when the current channel interval is an interval that can transmit the frame.

4. The multi channel operation apparatus of claim 3, wherein the data transmitting/receiving unit further comprises a plurality of first wait queues that store a frame of the control channel and that await transmission of the frame and that correspond to AC levels, respectively that are allocated according to a user priority order value;

a plurality of second wait queues that store a frame of the service channel and that await transmission of the frame and that correspond to AC levels, respectively that are allocated according to a user priority order value; and a priority order mapping unit that stores the frame in one of the plurality of first and second wait queues according to a user priority order value of the frame when the current channel interval is an interval that cannot transmit the frame.

5. The multi channel operation apparatus of claim 4, further comprising a channel routing unit that receives transmission interrupt that is generated from one of the plurality of first and second wait queues and that selects a frame from a wait queue of an AC level corresponding to an AC level of a hardware queue in which the transmission interrupt generates and that requests transmission of the selected frame to the channel operating unit.

6. The multi channel operation apparatus of claim 1, wherein the channel synchronization unit comprises a reference signal generator that generates the reference signal;

an operating reset unit that sets synchronization of the sync interval in synchronism with the reference signal; and a channel determining unit that transfers information of the channel interval to the data transmitting/receiving unit when the channel interval is changed.

7. The multi channel operation apparatus of claim 6, wherein the reference signal generator generates the reference signal using a GPS signal or a TA message.

8. A method of operating a multi channel for communication in a communication apparatus of a vehicle or a road side base station in a vehicle communication system, the method comprising:

alternately setting, executed by a processor, a control channel interval and a service channel interval in synchronism with a reference signal;

receiving, executed by the processor, a transmission request of a frame from an upper level layer;

checking, executed by the processor, a user priority order value of the frame; and differentially transmitting, executed by the processor, if the frame can be transmitted at the current channel interval from a user priority order value of the frame, the frame according to a user priority order value of the frame.

9. The method of claim 8, wherein the check of the user priority order value comprises determining whether the frame is a management frame or an IP frame from a user priority order value of the frame, and the differentially of transmitting the frame comprises determining that the frame can be transmitted at the current channel interval, if the frame is a management frame at the control channel interval, or if the frame is an IP frame at the service channel interval.

10. The method of claim 8, further comprising differentially awaiting, executed by the processor, if the frame cannot be transmitted at the current channel interval from a user priority order value of the frame, transmission of the frame according to the user priority order value of the frame.

* * * * *